(12) United States Patent
Itakura et al.

(10) Patent No.: US 11,822,177 B2
(45) Date of Patent: Nov. 21, 2023

(54) DISPLAY DEVICE

(71) Applicant: Japan Display Inc., Tokyo (JP)

(72) Inventors: Shimon Itakura, Tokyo (JP); Yuzo Ota, Tokyo (JP); Yuuichi Kanesaka, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 17/941,039

(22) Filed: Sep. 9, 2022

(65) Prior Publication Data

US 2023/0072868 A1 Mar. 9, 2023

(30) Foreign Application Priority Data

Sep. 9, 2021 (JP) ................. 2021-146954

(51) Int. Cl.
*G02F 1/1335* (2006.01)
*G02F 1/1333* (2006.01)

(52) U.S. Cl.
CPC .. *G02F 1/133512* (2013.01); *G02F 1/133331* (2021.01); *G02F 1/133528* (2013.01)

(58) Field of Classification Search
CPC ......... G02F 1/133512; G02F 1/133331; G02F 1/133528; G02F 1/133308; G02F 2001/13332; G02F 2001/133314; G02F 2001/133317
See application file for complete search history.

(56) References Cited

U.S. PATENT DOCUMENTS

| | | | | |
|---|---|---|---|---|
| 2013/0027857 | A1* | 1/2013 | Jeong ................ | G02F 1/133512 361/679.01 |
| 2015/0362775 | A1* | 12/2015 | Shimokawa ...... | G02F 1/133308 349/12 |
| 2017/0031202 | A1* | 2/2017 | Lee ................... | G02F 1/133512 |
| 2018/0074249 | A1* | 3/2018 | Hirasawa ............ | G02B 6/0068 |
| 2018/0149922 | A1 | 5/2018 | Sugiyama et al. | |
| 2020/0225529 | A1* | 7/2020 | Yamanaka ........ | G02F 1/133308 |
| 2020/0344390 | A1* | 10/2020 | Ou ...................... | H04N 5/2253 |

FOREIGN PATENT DOCUMENTS

JP 2018-88322 A 6/2018

* cited by examiner

*Primary Examiner* — Mariam Qureshi
(74) *Attorney, Agent, or Firm* — XSENSUS LLP

(57) ABSTRACT

According to one embodiment, a display device includes a liquid crystal display panel including a first substrate and a second substrate opposed to each other, a liquid crystal layer sandwiched between the first substrate and the second substrate, a first polarizer provided to be in contact with the first substrate, a second polarizer provided to be in contact with the second substrate, a cover glass, and a light-shielding layer covering a part of a bottom surface and an edge portion of the first substrate, an edge portion and a part of an upper surface of the second substrate, and an edge portion of the second polarizer; a frame; and a light-shielding cushion member provided between the frame and the liquid crystal display panel.

8 Claims, 8 Drawing Sheets

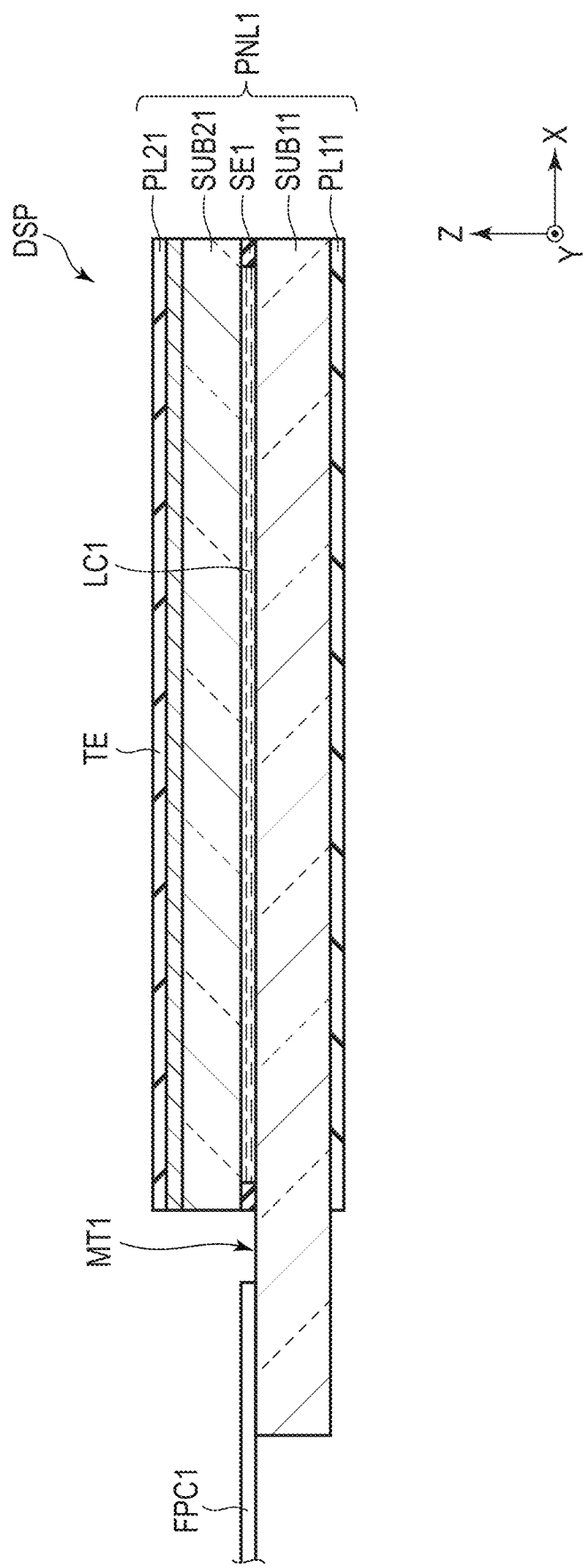
F I G. 2

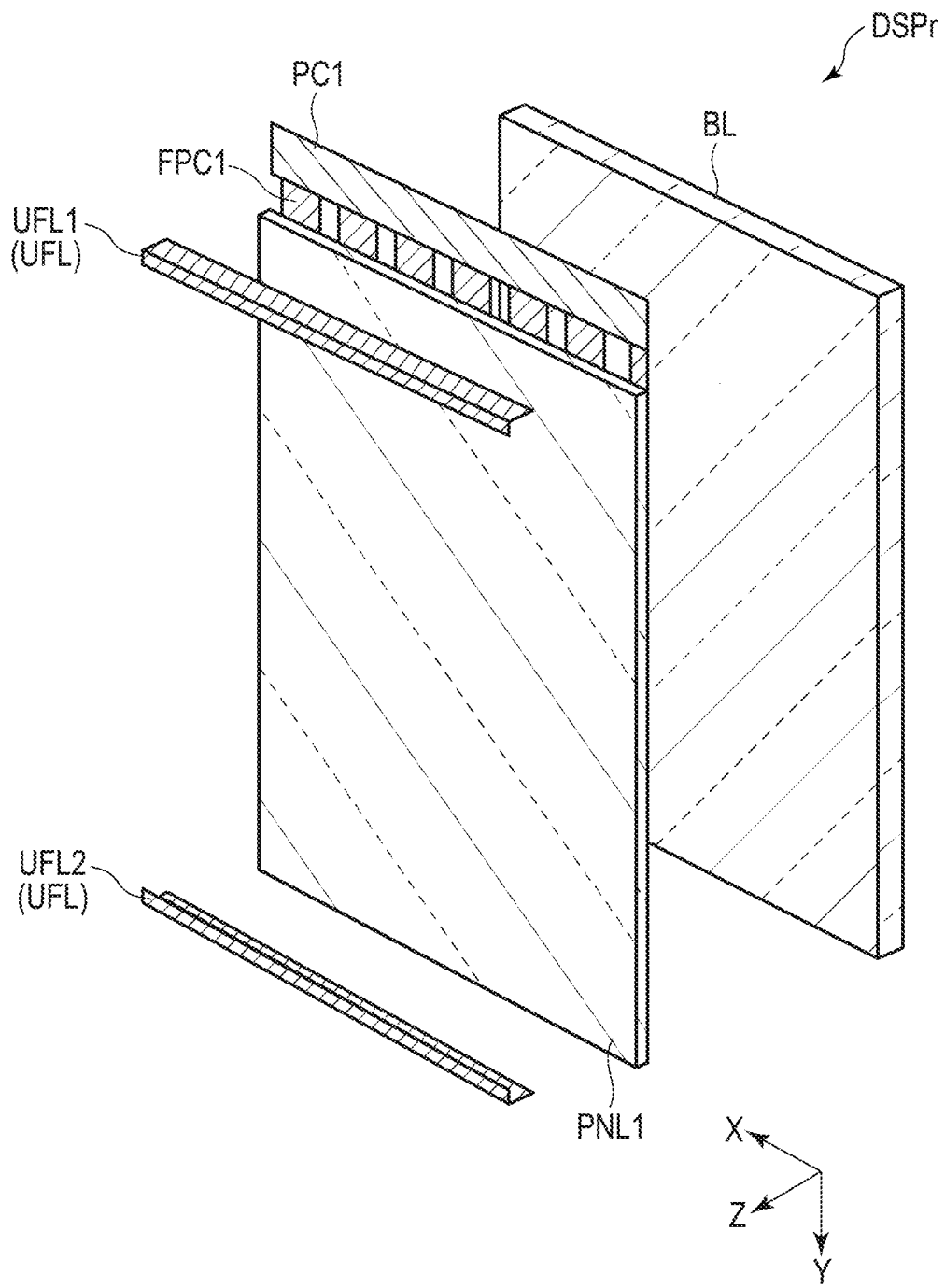
F I G. 3

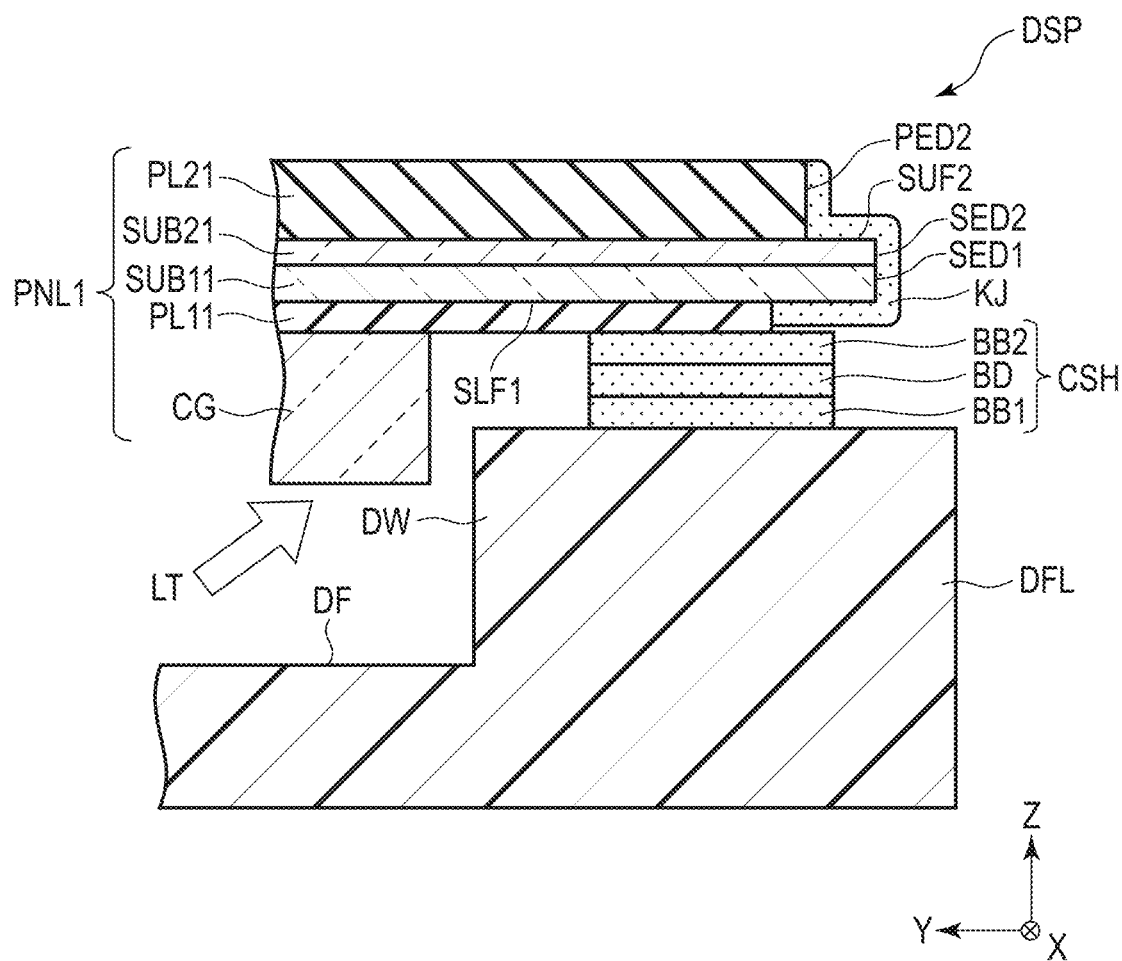
F I G. 7

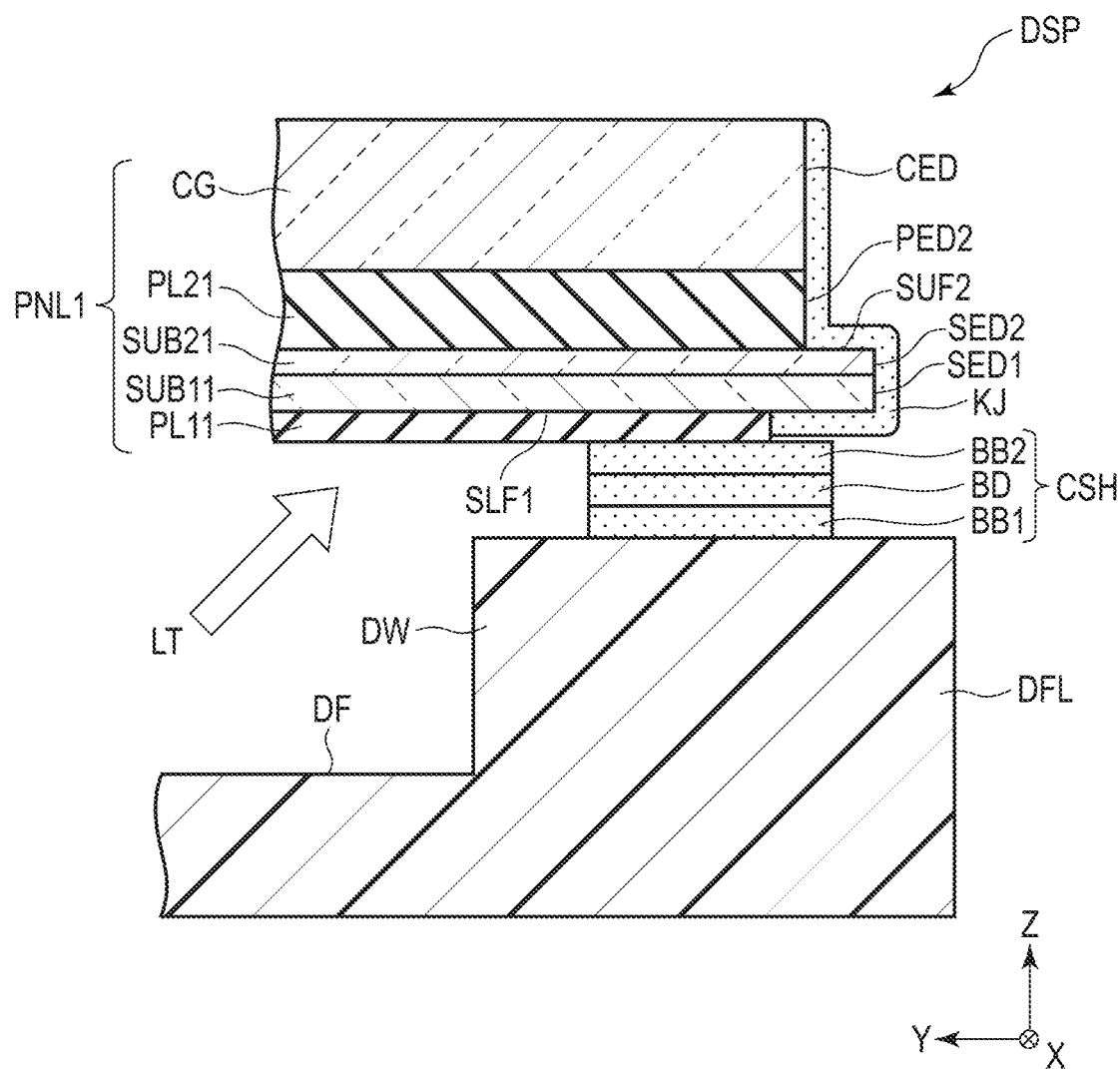
F I G. 8

DISPLAY DEVICE

CROSS-REFERENCE TO RELATED APPLICATIONS

This application is based upon and claims the benefit of priority from Japanese Patent Application No. 2021-146954, filed Sep. 9, 2021, the entire contents of which are incorporated herein by reference.

FIELD

Embodiments described herein relate generally to a display device.

BACKGROUND

A backlight device capable of achieving thinner and narrower frames, and a liquid crystal display device comprising the backlight device have been developed.

BRIEF DESCRIPTION OF THE DRAWINGS

FIG. 2 is a cross-sectional view showing an example of a schematic configuration of the liquid crystal display panel.
FIG. 3 is an exploded perspective view showing the display device of the comparative example.
FIG. 7 is a cross-sectional view showing a configuration example of the display device according to the embodiment.
FIG. 8 is a cross-sectional view showing a configuration example of the display device according to the embodiment.

DETAILED DESCRIPTION

Figure 1:
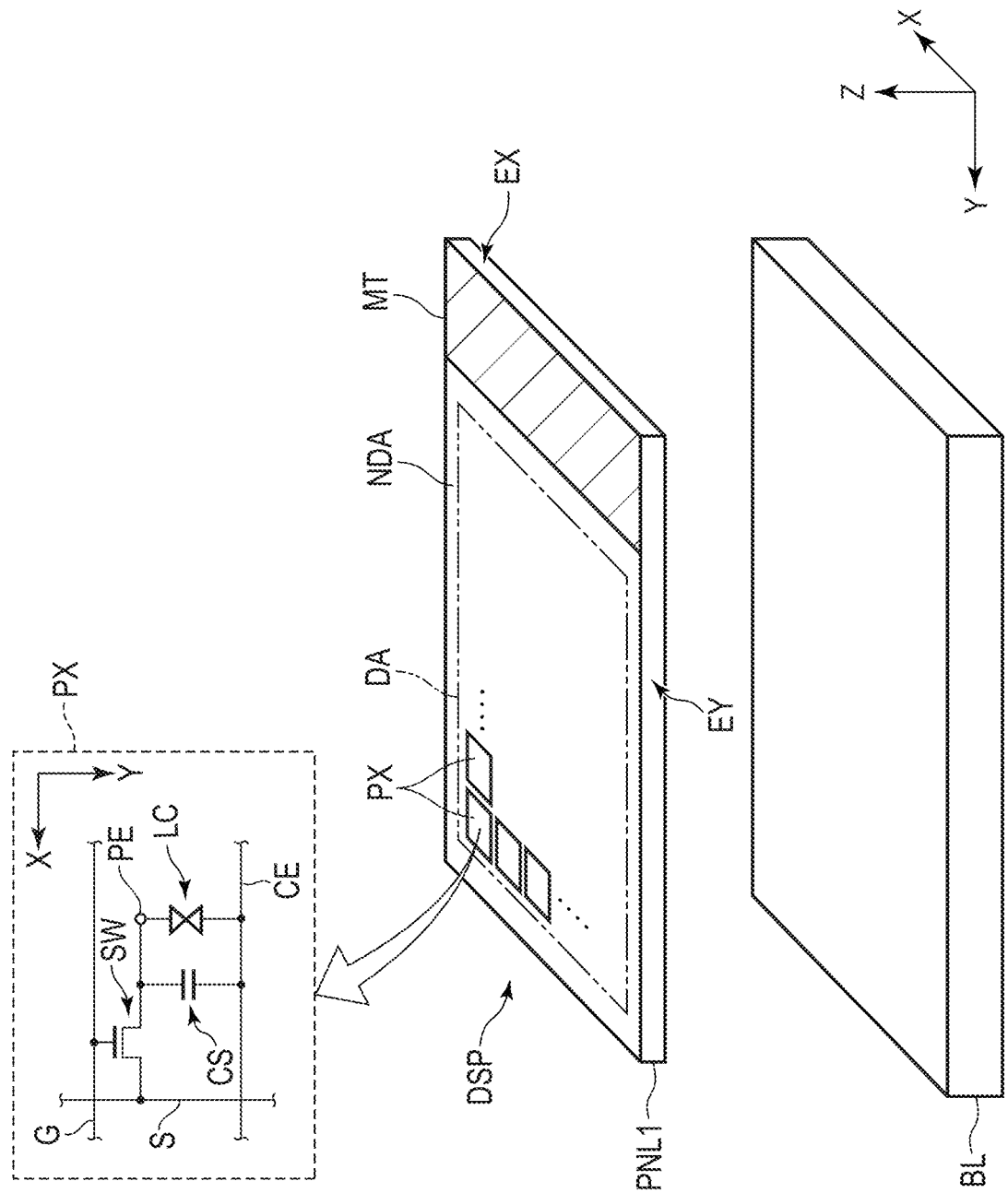
FIG. 1 is an exploded perspective view showing a schematic example of a display device.

The embodiment can provide a display device capable of preventing light leakage and suppressing non-uniformity in stress.

In general, according to one embodiments, a display device comprising: a liquid crystal display panel comprising a first substrate and a second substrate opposed to each other, a liquid crystal layer sandwiched between the first substrate and the second substrate, a first polarizer provided to be in contact with the first substrate, a second polarizer provided to be in contact with the second substrate, a cover glass, and a light-shielding layer covering a part of a bottom surface and an edge portion of the first substrate, an edge portion and a part of an upper surface of the second substrate, and an edge portion of the second polarizer; a frame; and a light-shielding cushion member provided between the frame and the liquid crystal display panel.

Each embodiment will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes and the like, of the respective parts are illustrated schematically in the drawings, rather than as an accurate representation of what is implemented. However, such schematic illustration is merely exemplary, and in no way restricts the interpretation of the invention. In addition, in the specification and drawings, the same elements as those described in connection with preceding drawings are denoted by like reference numbers, and detailed description thereof is omitted unless necessary.

A display device according to one of the embodiments will be described hereinafter with reference to the accompanying drawings.

In the embodiments, a first direction X, a second direction Y and a third direction Z are orthogonal to each other, but they may intersect at an angle other than 90 degrees. In the following descriptions, a direction forwarding a tip of an arrow indicating the third direction Z is referred to as "upward" or "above" and a direction forwarding oppositely from the tip of the arrow is referred to as "downward" or "below". The first direction X, the second direction Y and third direction Z may as well be referred to as an X direction, a Y direction and a Z direction, respectively.

With such expressions "a second member above a first member" and "a second member below a first member", the second member may be in contact with the first member or may be remote from the first member. In the latter case, a third member may be interposed between the first member and the second member. On the other hand, with such expressions "a second member on a first member" and "a second member on a first member", the second member is meant to be in contact with the first member.

In addition, it is assumed that there is an observation position to observe the semiconductor substrate on a tip side of an arrow in the third direction Z, and viewing from this observation position toward the X-Y plane defined by the first direction X and the second direction Y is referred to as a planar view. Viewing a cross section of the transistor in an X-Z plane defined by the first direction X and the third direction Z or a Y-Z plane defined by the second direction Y and the third direction Z is referred to as a cross-sectional view.

Embodiment

FIG. 1 is an exploded perspective view showing a schematic example of a display device. As shown in FIG. 1, a display device DSP comprises a liquid crystal display panel PNL1 and a backlight unit BL. A dimming panel may be provided between the liquid crystal display panel PNL1 and the backlight unit BL.

The liquid crystal display panel PNL1 has, for example, a rectangular shape. In the example illustrated, short sides EX of the liquid crystal display panel PNL1 are parallel to the first direction X and long sides EY of the liquid crystal display panel PNL1 are parallel to the second direction Y. The third direction Z corresponds to a direction of thickness of the liquid crystal display panel PNL1. A main surface of the liquid crystal display panel PNL1 is parallel to an X-Y plane defined by the first direction X and the second direction Y. The liquid crystal display panel PNL1 includes a display area DA and a non-display area NDA located outside the display area DA. The non-display area NDA includes a terminal area MT in which a driver IC or a flexible wiring board is mounted. In FIG. 1, the terminal area MT is represented by hatch lines.

The display area DA is an area for displaying an image and includes, for example, a plurality of pixels PX arrayed in a matrix. As shown and enlarged in FIG. 1, each pixel PX is disposed in an area sectioned by a scanning line G and a signal line S, and comprises a switching element SW, a pixel electrode PE, a common electrode CE, a liquid crystal layer LC, and the like.

The switching element SW is constituted by, for example, a thin-film transistor (TFT) and is electrically connected to the scanning line G and the signal line S. The scanning line G is electrically connected to the switching element SW in each of the pixels PX arranged in the first direction X. The signal line S is electrically connected to the switching element SW in each of the pixels PX arranged in the second direction Y. The pixel electrode PE is electrically connected to the switching element SW. Each of the pixel electrodes PE is opposed to the common electrode CE, and the liquid crystal layer LC is driven by an electric field produced between the pixel electrode PE and the common electrode CE. A capacitor CS is formed between, for example, an electrode having the same electric potential as the common electrode CE and an electrode having the same potential as the pixel electrode PE.

The terminal area MT extends along the short sides EX of the liquid crystal display panel PNL1. A terminal portion is formed in the terminal area MT, and the liquid crystal display panel PNL1 is electrically connected to, for example, an external device such as a flexible wiring board or the like through the terminal portion.

The detailed configuration of the liquid crystal display panel PNL1 will be described below along with the description in FIG. 2.

The backlight unit BL is arranged below the liquid crystal display panel PNL1 such that an image is displayed by controlling light from the backlight unit BL in each pixel PX.

FIG. 2 is a cross-sectional view showing an example of a schematic configuration of the liquid crystal display panel. The liquid crystal panel PNL1 comprises a first substrate SUB11, a second substrate SUB21, a liquid crystal layer LC1, a transparent conductive layer TE1, a first polarizer PL11, and a second polarizer PL21.

The liquid crystal layer LC1 is sandwiched between the first substrate SUB11 and the second substrate SUB21 that are opposed to each other, and is sealed by a seal SE1. The first polarizer PL11 is arranged under the first substrate SUB11 and the second polarizer PL21 is arranged under the second substrate SUB21. A polarization axis of the first polarizer PL11 and a polarization axis of the second polarizer PL21 have, for example, a crossed-Nicol relationship, i.e., cross at 90 degrees.

A transparent conductive layer TE is provided between the second substrate SUB21 and the second polarizer PL21 to be in contact with the second substrate SUB21. Charging the liquid crystal display panel PNL1 with static electricity can be prevented by providing the transparent conductive layer TE.

A first flexible printed circuit FPC1 is mounted in the terminal area MT of the liquid crystal display panel PNL1.

A comparative example of the present invention will be described here. FIG. 3 is an exploded perspective view showing the display device of the comparative example. A display device DSPr comprises the liquid crystal display panel PNL1, the backlight unit BL, and upper frames UFL. The first flexible printed circuit FPC1 and a printed circuit PC1 are provided on the liquid crystal display panel PNL1. The upper frames UFL include a first portion UFL1 and a second portion UFL2. The upper frames UFL may be simply referred to as frames.

The first portion UFL1 and the second portion UFL2 are provided along short sides of the liquid crystal display panel PNL1. No upper frames are provided on long sides of the liquid crystal display panel PNL1. Narrowing the frame can be thereby implemented.

However, since no upper frames are provided on the long sides, there is a risk of light leaking from the edge portions of the liquid crystal display panel PNL1.

In addition, the liquid crystal display panel PNL1 and the backlight unit BL are arranged but are not fixed. The backlight unit BL and the liquid crystal display panel PNL are simply stacked. To prevent light leakage, covering the edge portions of the liquid crystal display panel PNL1 with, for example, a light-shielding adhesive member is considered. In this case, the edge portions of the liquid crystal display panel PNL1 are fixed to the backlight unit BL by the adhesive member.

However, if the edge portions of the liquid crystal display panel PNL1 are fixed with an adhesive member, a problem arises that a stress caused by warping of the liquid crystal display panel PNL1 cannot be mitigated. If the stress cannot be mitigated, non-uniformity will occur in the liquid crystal display panel PNL1.

Figure 4:
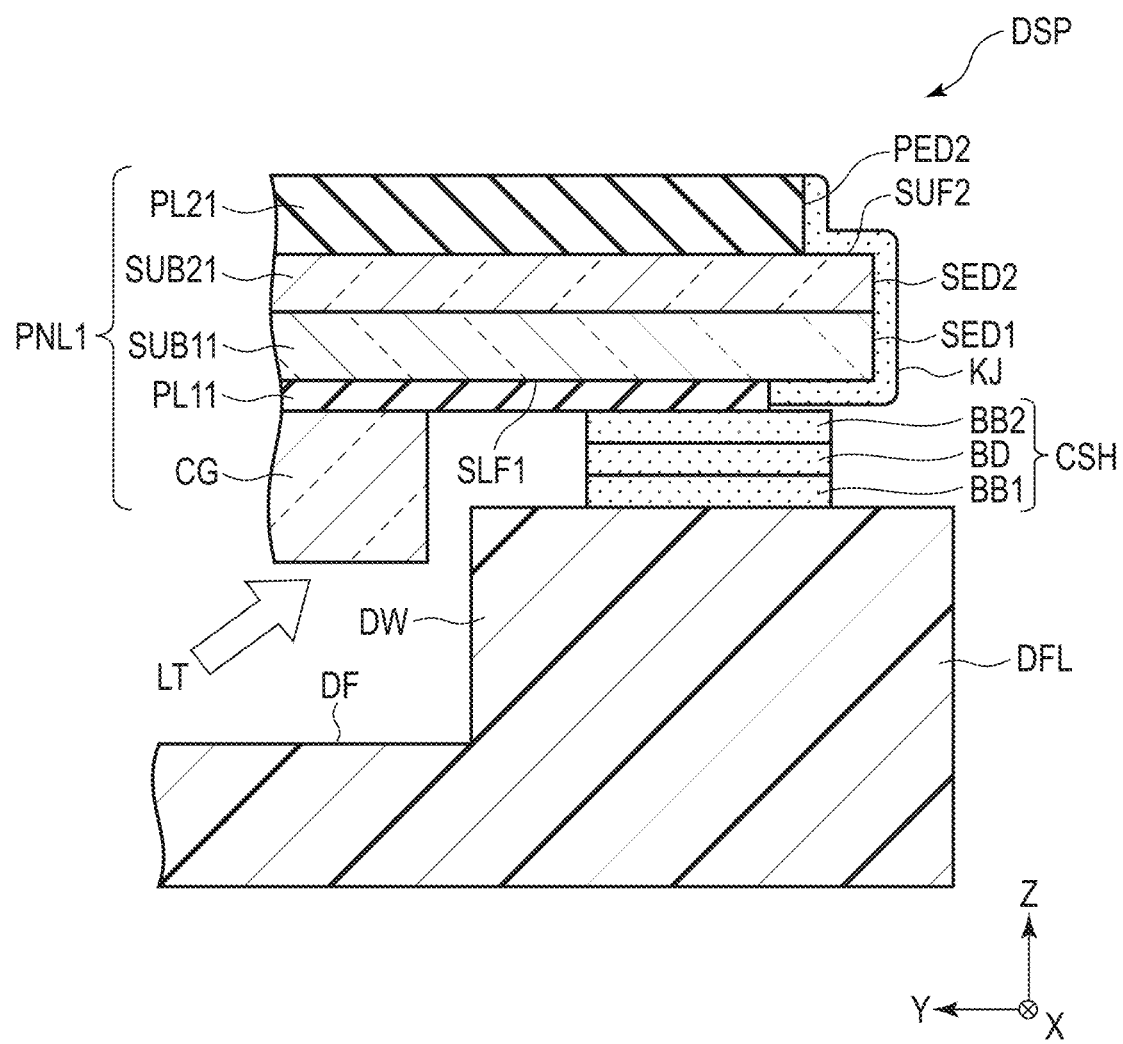
FIG. 4 is a cross-sectional view showing an example of a schematic configuration of the display device according to the embodiment.

FIG. 4 is a cross-sectional view showing an example of a schematic configuration of the display device according to the embodiment. The display device DSP comprises a lower frame DFL, a cushion member CSH, and the liquid crystal display panel PNL1. The lower frame DFL has a wall portion DW and a flat portion DF. Although not shown in the figure, the backlight unit BL is stored in a space formed by the wall portion DW and the flat portion DF. The lower frame DFL may be simply referred to as a frame. The lower frame DFL extends along the long and short sides of the liquid crystal display panel PNL1.

The cushion member CSH has light-shielding properties. More specifically, the cushion member CSH is composed of a black base material BD and two black adhesive layers BB1 and BB2 that sandwich the base material BD. In other words, the cushion member CSH is considered as a black cushion member. For example, a black resin film is used as the black base material BD. For example, double-sided adhesive layers in which black pigment is dispersed are used as the black adhesive layers BB1 and BB2. The cushion member CSH extends along the long edge of the liquid crystal display panel PNL1.

A light-shielding layer KJ is provided at the edge portion of the liquid crystal display panel PNL1. More specifically, the light-shielding layer KJ covers a part of a bottom surface SLF1 and an edge portion SED1 of the first substrate SUB11, an edge portion SED2 and a part of an upper surface SUF2 of the second substrate SUB21, and an edge portion PED2 of the second polarizer PL21.

The light-shielding layer KJ may be black ink or a black resin layer. However, a color having low light transmittance, such as dark gray or dark brown, other than black may be used. The color of not only the light-shielding layer KJ, but also the base material BD, the adhesive layer BB1, and the adhesive layer BB2 is not limited to black, but may be any color with low light transmittance.

Light LT from the backlight unit BL enters an inside of the liquid crystal display panel PNL1 from the first polarizer PL11. At this time, part of the light LT passes through the edge portion SED1 of the first substrate SUB11 and the edge portion SED2 of the substrate SUB21. If the light shielding layer KJ is not provided, the light LT would escape to the outside and light leakage from the edge portion of the liquid crystal display panel PNL 1 would occur. In the embodiment, since the light-shielding layer KJ is provided, light leakage from the edge portion of the liquid crystal display panel PNL1 does not occur.

The black cushion member CSH is provided between the liquid crystal display panel PNL1 and the lower frame DFL. An interval between the liquid crystal display panel PNL1 and the lower frame DFL is shielded from light by the cushion member CSH. Therefore, light LT cannot leak out from the interval between the liquid crystal display panel PNL1 and the lower frame DFL.

As described above, the light can be prevented from leaking from the edge portion of the display device DSP by the light-shielding layer KJ and the cushioning member CSH.

As described above, the cushion member CSH is composed of the base material BD and the adhesive layers BB1 and BB2 that sandwich the base material BD. The cushion member CSH has a predetermined flexibility, and does not adhere to the lower frame DFL and the liquid crystal display panel PNL1.

The light-shielding layer KJ also covers the edge portion of the liquid crystal display device PNL1 as described above, but does not fix the edge portion.

Since the cushioning member CSH and the light-shielding layer KJ do not fix the liquid crystal display panel PNL1, they can mitigate a stress.

The liquid crystal display panel PNL1 shown in FIG. 4 further comprises a cover glass CG in addition to the configuration shown in FIG. 2. The cover glass CG is provided on and in contact with a surface on a side opposite to a surface in contact with the first substrate SUB11, of the surface of the first polarizer PL11. The first polarizer PL11 is considered to be provided between the first substrate SUB 11 and the cover glass CG. Alternatively, the cover glass CG is considered to be arranged on the lower side of the liquid crystal display panel PNL1.

The first substrate SUB11 and the second substrate SUB21 are arranged along the cover glass CG. The cover glass CG is formed of a hard material so as to be thicker than the first substrate SUB11 and the second substrate SUB21. For example, tempered glass may be used as the cover glass CG. For this reason, the liquid crystal display panel PNL1 including the first substrate SUB11 and the second substrate SUB21 is unlikely to warp due to the stress.

In the display device DSP shown in FIG. 4, the display panel is unlikely to warp due to the stress by providing the cover glass CG. In addition to this, as described above, the cushioning member CSH and the light-shielding layer KJ do not fix the liquid crystal display panel PNL1. As a result, even if the stress occurs, the stress can be mitigated. Therefore, non-uniformity in the liquid crystal display panel PNL1 can be suppressed.

In the above-described embodiment, a display device capable of preventing light leakage and suppressing non-uniformity in stress can be provided.

Configuration Example 1

Figure 5:
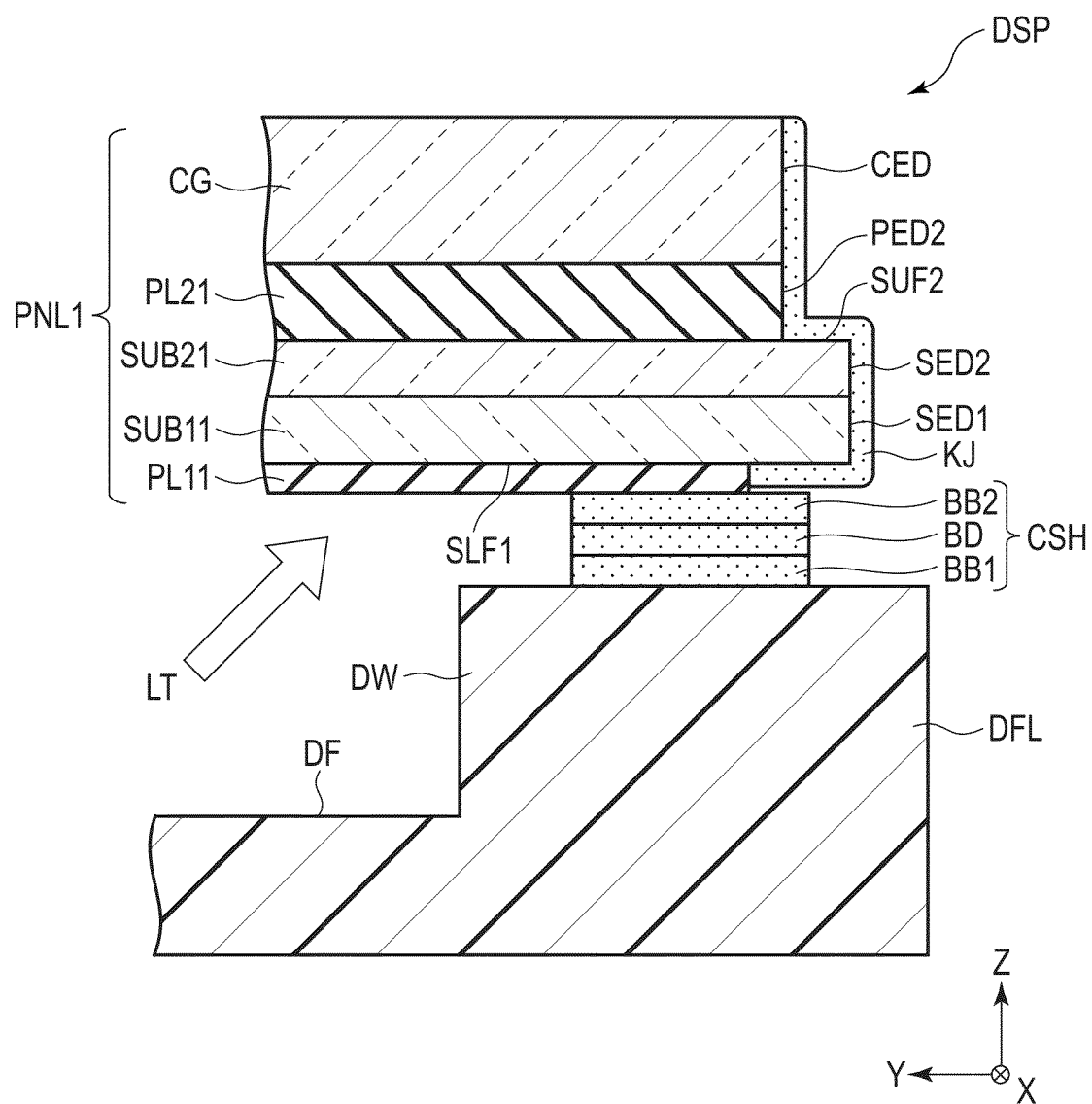
FIG. 5 is a cross-sectional view showing a configuration example of the display device according to the embodiment.

FIG. 5 is a cross-sectional view showing another configuration example of the display device according to the embodiment. The configuration example shown in FIG. 5 is different from the configuration example shown in FIG. 4 in the position at which the cover glass is provided.

In the display device DSP shown in FIG. 5, the cover glass CG is provided to be in contact with the second polarizer PL21. The second polarizer PL21 is considered to be provided between the cover glass CG and the substrate SUB21. Alternatively, the cover glass CG is considered to be arranged on the upper side of the liquid crystal display panel PNL1.

In the example shown in FIG. 5, too, the first substrate SUB11 and the second substrate SUB21 are arranged along the cover glass CG. Warp is unlikely to occur due to the stress by providing the cover glass CG.

The light-shielding layer KJ covers a part of the bottom surface SLF1 and the edge portion SED1 of the first substrate SUB11, the edge portion SED2 and a part of the upper surface SUF2 of the second substrate SUB21, the edge portion PED2 of the second polarizer PL21, and the edge portion CED of the cover glass CG. In the configuration example shown in FIG. 5, too, the light leaking from the edge portion of the display device DSP can be suppressed by the light-shielding layer KJ and the cushioning member CSH. In addition, similarly to the embodiment, warp caused by the stress can be suppressed by the cover glass CG. Since neither the cushioning member CSH nor the light-shielding layer KJ fixes the liquid crystal display panel PNL1 and the lower frame DFL, the stress is mitigated. The non-uniformity occurring in the liquid crystal display panel PNL1 can be suppressed.

Configuration Example 2

Figure 6:
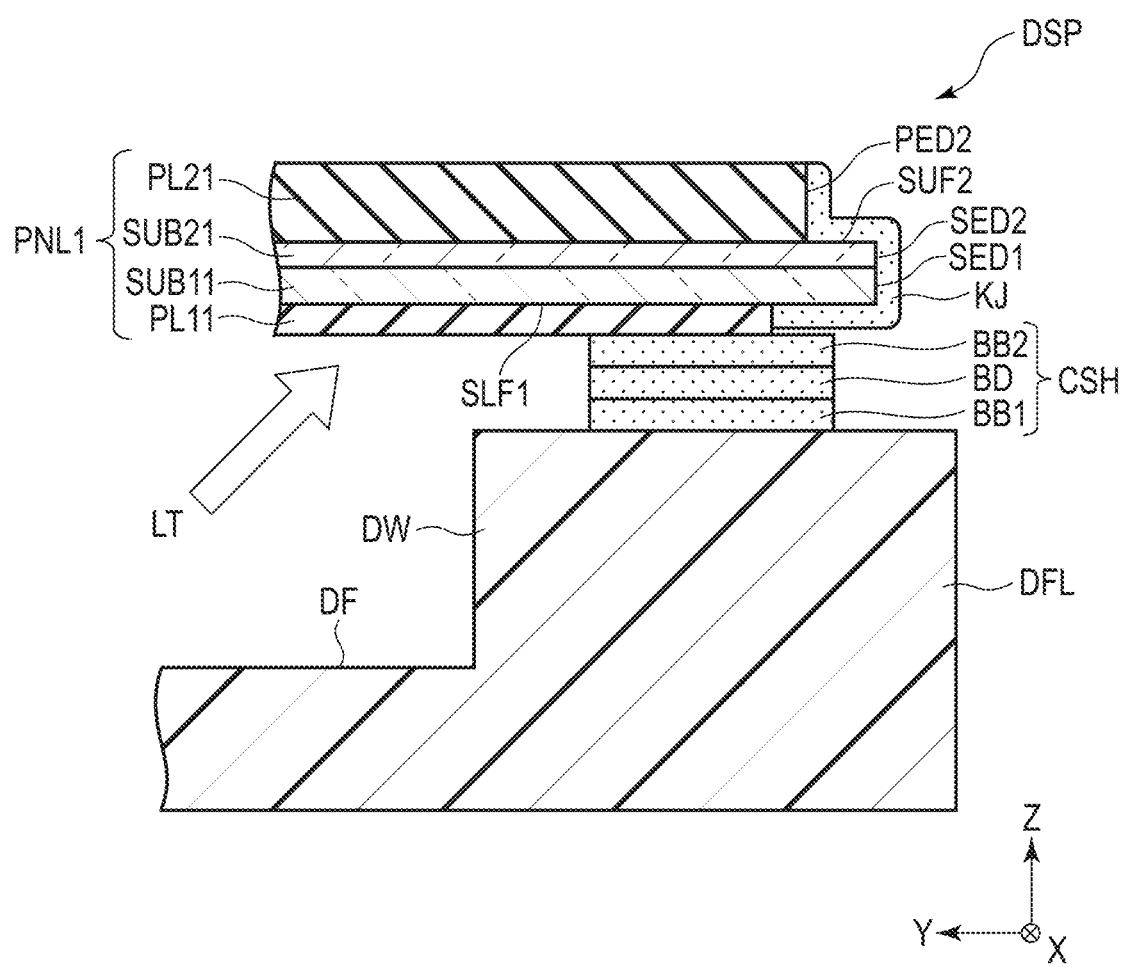
FIG. 6 is a cross-sectional view showing a configuration example of the display device according to the embodiment.

FIG. 6 is a cross-sectional view showing yet another configuration example of the display device according to the embodiment. The configuration example shown in FIG. 6 is different from the configuration example shown in FIG. 4 in reducing the thickness of the first substrate and the second substrate of the liquid crystal display panel.

The first substrate SUB11 and the second substrate SUB21 shown in FIG. 6 are thinner than these substrates shown in FIG. 4. To reduce the thickness of the substrates, the substrates may be polished after forming the liquid crystal display panel PNL1. Retardation of the liquid crystal display panel PNL1 is lowered by thinning the substrates. For this reason, non-uniformity in stress is suppressed.

At least one of the first substrate SUB11 and the second substrate SUB21 may be thinned, and it is unnecessary to polish both the substrates. When both the substrates are polished, a cover glass may be provided similarly to that shown in FIG. 4 and FIG. 5. This is because the strength is increased by providing the cover glass.

FIG. 7 is a cross-sectional view showing yet another configuration example of the display device according to the embodiment. The configuration example shown in FIG. 7 is different from the configuration example illustrated in FIG. 6 in providing the cover glass.

In the example shown in FIG. 7, the cover glass CG is provided to be in contact with the first polarizer PL11, similarly to the example shown in FIG. 4.

The light-shielding layer KJ covers a part of the bottom surface SLF1 and the edge portion SED1 of the first substrate SUB11, the edge portion SED2 and a part of the upper surface SUF2 of the second substrate SUB21, and the edge portion PED2 of the second polarizer PL21.

FIG. 8 is a cross-sectional view showing yet another configuration example of the display device according to the embodiment. The configuration example shown in FIG. 8 is different from the configuration example illustrated in FIG. 7 in the position of the cover glass.

In the example shown in FIG. 8, the cover glass CG is provided to be in contact with the second polarizer PL21, similarly to the example shown in FIG. 5.

The light-shielding layer KJ covers a part of the bottom surface SLF1 and the edge portion SED1 of the first substrate SUB11, the edge portion SED2 and a part of the upper surface SUF2 of the second substrate SUB21, the edge portion PED2 of the second polarizer PL21, and the edge portion CED of the cover glass CG.

In each of the examples shown in FIG. 7 and FIG. 8, the substrate on the side where the cover glass CG is provided may be polished to reduce its thickness. In other words, in the display device DSP of FIG. 7, the thickness of the first substrate SUB11 may be reduced, and the second substrate SUB21 may not be polished to keep its original thickness. In the display device DSP of FIG. 8, the thickness of the first substrate SUB21 may be reduced, and the second substrate SUB11 may not be polished to keep its original thickness.

In this configuration example, the same advantages as those in the embodiment can also be achieved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
    a liquid crystal display panel comprising
    a first substrate and a second substrate opposed to each other,
    a liquid crystal layer sandwiched between the first substrate and the second substrate,
    a first polarizer provided to be in contact with the first substrate,
    a second polarizer provided to be in contact with the second substrate,
    a cover glass, and
    a light-shielding layer covering a part of a bottom surface and an edge portion of the first substrate, an edge portion and a part of an upper surface of the second substrate, and an edge portion of the second polarizer;
    a frame including a wall portion and a flat portion; and
    a light-shielding cushion member provided between the frame and the liquid crystal display panel, wherein
    the wall portion of the frame extends along long and short sides of the liquid crystal display panel,
    an entire surface of the light-shielding cushion member overlaps the wall portion, and
    a part of the light-shielding layer overlaps the light-shielding cushion member,
    the light-shielding cushion member is located on and in contact with the wall portion of the frame,
    the first polarizer is located on and in contact with the light-shielding cushion member,
    the first substrate is located on and in contact with the first polarizer,
    the second substrate is located on and in contact with the first substrate,
    the second polarizer is located on and in contact with the second substrate, and
    the light-shielding cushion member covers a side surface of the first substrate and a side surface of the second substrate.

2. The display device according to claim 1, wherein the cover glass is provided to be in contact with the first polarizer.

3. The display device according to claim 1, wherein the cover glass is provided to be in contact with the second polarizer.

4. The display device according to claim 3, wherein the light-shielding layer further covers an edge portion of the cover glass.

5. The display device according to claim 1, wherein the cushion member comprises a black base material, and two black adhesive layers sandwiching the base material.

6. The display device according to claim 1, wherein the cushion member comprises a dark gray or dark brown base material, and two dark gray or dark brown adhesive layers sandwiching the base material.

7. The display device according to claim 1, wherein the light-shielding layer is black ink or a black resin layer.

8. The display device according to claim 1, wherein the light-shielding layer is dark gray or dark brown ink, or a dark gray or dark brown resin layer.

* * * * *